United States Patent
Brahmbhatt et al.

(10) Patent No.: US 9,355,096 B1
(45) Date of Patent: May 31, 2016

(54) FOOD STORAGE CONTAINER TAG SYSTEM AND METHOD

(71) Applicant: The Orange Chef Company, San Francisco, CA (US)

(72) Inventors: Ankit Brahmbhatt, San Francisco, CA (US); Santiago Merea, San Francisco, CA (US)

(73) Assignee: THE ORANGE CHEF COMPANY, San Francisco, CA (US)

( * ) Notice: Subject to any disclaimer, the term of this patent is extended or adjusted under 35 U.S.C. 154(b) by 0 days.

(21) Appl. No.: 14/280,144

(22) Filed: May 16, 2014

(51) Int. Cl.
  *G06F 17/00* (2006.01)
  *G06K 19/06* (2006.01)
  *G06F 17/30* (2006.01)

(52) U.S. Cl.
  CPC .................................... *G06F 17/30* (2013.01)

(58) Field of Classification Search
  CPC ............... G06K 19/0723; G06K 19/07758; G01G 19/3728; G01G 19/4146
  USPC ................... 235/375, 492; 177/50; 702/173; 340/10.1
  See application file for complete search history.

(56) References Cited

U.S. PATENT DOCUMENTS

| | | | |
|---|---|---|---|
| 4,840,239 A | 6/1989 | Slagg | |
| 5,544,684 A | 8/1996 | Robinettelll | |
| 5,934,181 A | 8/1999 | Adamczewski | |
| 6,412,398 B1 | 7/2002 | Norcross | |
| 6,837,148 B1 | 1/2005 | Deschenes | |
| 6,978,221 B1 | 12/2005 | Rudy | |
| 6,982,640 B2 | 1/2006 | Lindsay | |
| 7,292,146 B1 | 11/2007 | Nguyen | |
| 7,409,765 B2 | 8/2008 | So | |
| 7,523,302 B1 | 4/2009 | Brown, III | |
| 7,620,568 B1 | 11/2009 | Parker-Malchak | |
| 7,680,691 B2 | 3/2010 | Kimball | |
| 8,200,548 B2 | 6/2012 | Wiedl | |
| 8,235,724 B2 | 8/2012 | Gilley | |
| 8,636,516 B2 | 1/2014 | Batsikouras | |
| 8,770,983 B2 | 7/2014 | Batsikouras | |
| 8,829,365 B1 | 9/2014 | Wallace | |

(Continued)

FOREIGN PATENT DOCUMENTS

| | | | |
|---|---|---|---|
| JP | 2005-10951 | * | 1/2005 |
| WO | 0238456 | | 5/2002 |

OTHER PUBLICATIONS

U.S. Appl. No. 61/800,252, filed Mar. 15, 2013.

(Continued)

*Primary Examiner* — Laura Gudorf
(74) *Attorney, Agent, or Firm* — Sheppard Mullin Richter & Hampton LLP

(57) ABSTRACT

This disclosure relates to a system configured to electronically store dish information on tags coupled with storage containers. The system may include near field communication components that facilitate an improved meal preparation and/or meal storage experience for users. Containers (e.g., cups, bowls, plates, etc.) may be coupled with an individual tag that is configured to electronically store information about the container, the contents of the container, and/or other information. By including such components in the system a given container coupled with a corresponding tag may become "smart." For example, a sensor included in a scale may recognize a tag and/or determine information related to the contents of the container when the container is placed on and/or near the scale.

17 Claims, 7 Drawing Sheets

(56) References Cited

U.S. PATENT DOCUMENTS

| | | | |
|---|---|---|---|
| 2003/0159857 A1* | 8/2003 | Lin | G01G 19/50 |
| | | | 177/25.13 |
| 2004/0118618 A1 | 6/2004 | Davidson | |
| 2009/0009815 A1 | 1/2009 | Karasik | |
| 2009/0144081 A1 | 6/2009 | Harlan | |
| 2009/0157752 A1 | 6/2009 | Gonzalez | |
| 2009/0258331 A1 | 10/2009 | Do | |
| 2009/0259687 A1 | 10/2009 | Do | |
| 2009/0309704 A1* | 12/2009 | Chang et al. | 340/10.1 |
| 2010/0038149 A1 | 2/2010 | Corel | |
| 2010/0125181 A1 | 5/2010 | Hyde | |
| 2010/0240962 A1 | 9/2010 | Contant | |
| 2011/0044370 A1 | 2/2011 | Schochet | |
| 2011/0167100 A1 | 7/2011 | Brodowski | |
| 2011/0168456 A1* | 7/2011 | Sharawi et al. | 177/25.16 |
| 2011/0213667 A1 | 9/2011 | Ierullo | |
| 2012/0136864 A1 | 5/2012 | Ochtel | |
| 2012/0179665 A1 | 7/2012 | Baarman | |
| 2013/0029298 A1* | 1/2013 | Batsikouras | 434/127 |
| 2013/0171304 A1 | 7/2013 | Huntley | |
| 2013/0209972 A1 | 8/2013 | Carter | |
| 2013/0216982 A1 | 8/2013 | Bennett | |
| 2013/0268111 A1 | 10/2013 | Dekar | |
| 2014/0318874 A1 | 10/2014 | Moses | |
| 2014/0332289 A1 | 11/2014 | Gallagher | |
| 2014/0356492 A1 | 12/2014 | Merea | |
| 2015/0260699 A1 | 9/2015 | Minvielle | |

OTHER PUBLICATIONS

Trew, James "HAPILABS introduces HAPIfork (and spoon) smart utensils, brings metrics to your mouthfuls (hands-on)" ,http://www.engadget.com/2013/01/06/hapilabs-introduces-hapifork-andspoon-smart-utensils-brings/, Jan. 6, 2013, retrieved Feb. 20, 2014.

Seth, Radhika, "Tasy Tasings" , http://www.yankodesign.com/2012/10/23/tastytastings/, Oct. 23, 2012, retrieved Feb. 20, 2014.

Comstock, Jonah, "Lift Labs raises $1M for tremor-canceling spoon", http://mobihealthnews.com/25502/lift-labs-raises-1m-for-tremor-canceling-spoon/.

"French Digital Kitchen" , http://digitalinstitute.ncl.ac.uk/ilablearnkitchen/, retrieved Feb. 20, 2014.

Hooper, Clare, Clare Hooper\s Blog, "More activity recognition" http://www.clarehooper.net/blog/2012/04/more-activity-recognition/, Apr. 17.

Pham, Coung et al., "The Ambient Kitchen: A Pervasive Sensing Environment for Situated Services" http://www.clarehooper.net/publications/2012/DIS2012demo.pdf, Jun. 11, 2012, retrieved Feb. 20, 2014.

WAX Sensor, http://europeandigitalkitchen.com/wp-content/uploads/2012/01/Lancook-Utensils-Brochure.pdf, retrieved Feb. 20, 2014.

Roberti, Mark, "RFID's Role in Food Safety", RFID Journal, http://www.rfidjournal.com/articles/view?10864, Jul. 29, 2013.vbTab.

Wikipedia, "Food Packaging", http://en.wikipedia.org/wiki/Food_packaging, retrieved May 16, 2014.

RFID digital weighing scales with printer, http://www.alibaba.com/productgs/614113341/LED_displayer_RFID_digital_weighing_scales.html, retrieved May 16.

My Recipe Book,"Typing Recipes into the App" , Oct. 5, 2012, Retrieved on Apr. 9, 2013 from http://www.myrecipebookapp.com/?p=90, 2 pages.

Turnage, Will, "Kitchen Scale App Prototype" , http://www.youtube.com/watch?v=S5WNCv4cqfg, Apr. 22, 2012, Retrieved on Jun. 3, 2013, 3 pages.

Terso Solutions, "RFID Refrigerator", http://www.tersosolutions.com/rfid-refrigerators/, retrieved May 19, 2014.

Discover RFID, http://www.discoverrfid.org/what-is-possible/get-what-you-want/perfectly-cooked-recipes.html.

Notice of Allowance issued in U.S. Appl. No. 13/909,011 dated Oct. 13, 2015; 10 pages.

Office Action issued in U.S. Appl. No. 13/909,011 dated Apr. 6, 2015; 14 pages.

Office Action issued in U.S. Appl. No. 14/185,857 dated Oct. 23, 2015; 22 pages.

Smart Diet Scale Features, http:/smartdietscale.com/how-it-works/; retrieved on Apr. 6, 2015; 7 pages.

Watts, Tom, "Smart Diet Scale makes it easy to lose weight"; The Macomb Daily; Jan. 31, 2013, 2 pages; www.macombdaily.com.

Cheng, Jacqui, "Cooking with the IPad: Which Apps Offer the Best Experience?" Ars Technica. Conde Nast, Aug. 7, 2012. Web. Mar. 3, 2016 <http://arstechnica.com/apple/2012/08/cooking-with-the-ipad-which-apps-offer-the-best-experience/> 8 pgs.

* cited by examiner

FOOD STORAGE CONTAINER TAG SYSTEM AND METHOD

FIELD OF THE DISCLOSURE

This disclosure relates to a system configured to electronically store dish information on tags coupled with storage containers.

BACKGROUND

Using radio frequency identification (RFID) systems to identify products during shipment and storage is known. Such systems typically rely on direct input from users via a user interface to program information into identification equipment fixed to the shipped and stored products. No such systems work together with a scale during food preparation to identify the contents of a storage container.

SUMMARY

One aspect of the disclosure relates to a system configured to electronically store dish information on tags coupled with storage containers. The dish information may be related to properties of a given container, the ingredients of a dish held by a container, and/or other information. The system may include near field communication (NFC) components that facilitate an improved meal preparation and/or meal storage experience for users. The near field communication components may include tags, transceivers, processors, and/or other components. The containers (e.g., cups, bowls, plates, etc.) may be coupled with an individual tag that is configured to electronically store the dish information, information about the container, the contents of the container, and/or other information. By including NFC components in the system a given container coupled with a corresponding tag may become "smart."

After a user finishes preparing and/or serving a dish using a scale included in the system, the system may be configured to identify containers into which leftovers are placed. The system may be configured to determine what food is stored in which containers, where the containers are stored, individual nutritional information for the food stored in a given container, and/or other dish information. The system may be configured to facilitate electronic storage of this dish information on the tags coupled with the containers, in electronic storage, and/or in other locations. The dish information may include, for example, information related to a name of the dish, an ingredients list, a calorie content, nutritional information, allergy information, a number of servings held by the container, quantities of individual ingredients in the dish, preparation instructions, a dish preparation date, a dish expiration date, a storage location, and/or other information.

The system may be useful when a user wants to add an ingredient to a dish after it has already been prepared and the ingredients are held by a container (e.g., a bowl). The system eliminates the need to transfer the contents of the container into other containers so that information about the new ingredient alone may be determined. The system may be configured to exclude the weight (for example) of the container (e.g., stored on the tag) and/or its contents when determining information related to the new ingredient (e.g., determining a weight of the new ingredient, calculating a calorie content of the dish including the new ingredient, etc.).

The system may include one or more processors configured to communicate wirelessly with the scale, a transceiver of a tag coupled with a container, external resources, one or more sensors, a user interface, electronic storage, and/or other components of the system. The one or more processors may be configured to execute computer program components. The computer program components may include an ingredient component, a mass component, a dish information component, a communication component, and/or other components.

The ingredient component may be configured to obtain ingredient information indicating which individual ingredient is currently being added to a dish. The ingredient information may be obtained from a user via user interface, obtained via external resources, and/or obtained via in other ways.

The mass component may be configured to determine the masses and/or weights of the individual ingredients added to the dish, of the container, and/or other masses and/or weights. The determinations may be based on the output signals from the scale and/or other information.

The dish information component may be configured to determine dish information for the dish. The dish information component may determine the dish information based on information determined by the ingredient component, information determined by the mass component, the output signals from scale, information stored on a tag coupled with a container holding the dish, and/or other information. As described above, in some implementations, the dish information may include information related to one or more of a name of the dish, an ingredients list, a calorie content, nutritional information, allergy information, a number of servings held by the container, quantities of individual ingredients in the dish, preparation instructions, a dish preparation date, a dish expiration date, a storage location, and/or other information. In some implementations, the dish information may include information related to specific dietary labels, allergens, and/or other information. The allergens may include, for example, foods such as dairy, shellfish, tree nuts, peanuts, and/or other food and/or drink allergens. The specific dietary labels may include vegetarian, vegan, gluten free, kosher, and/or other dietary labels. In some implementations, the dish information component may determine the information related to specific dietary labels, allergens, and/or other information so that a user may be notified of the specific dietary labels and/or allergens associated with a given dish when a container holding the dish is later retrieved from storage and a sensor reads the information on the tag coupled to the container, for example.

The communication component may be configured to cause a wireless transceiver coupled with the scale to transmit the dish information, the mass of the container, and/or other information to a wireless transceiver included in the tag that is coupled with the container holding the dish so that the dish information, the mass of the container, and/or other information may be stored on the tag. The communication component may be configured to receive dish information, the mass of the container, and/or other information stored on a tag via a wireless transceiver, and/or other components of the system responsive to a sensor detecting presence of a tag coupled with a container at or near the scale.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1A:
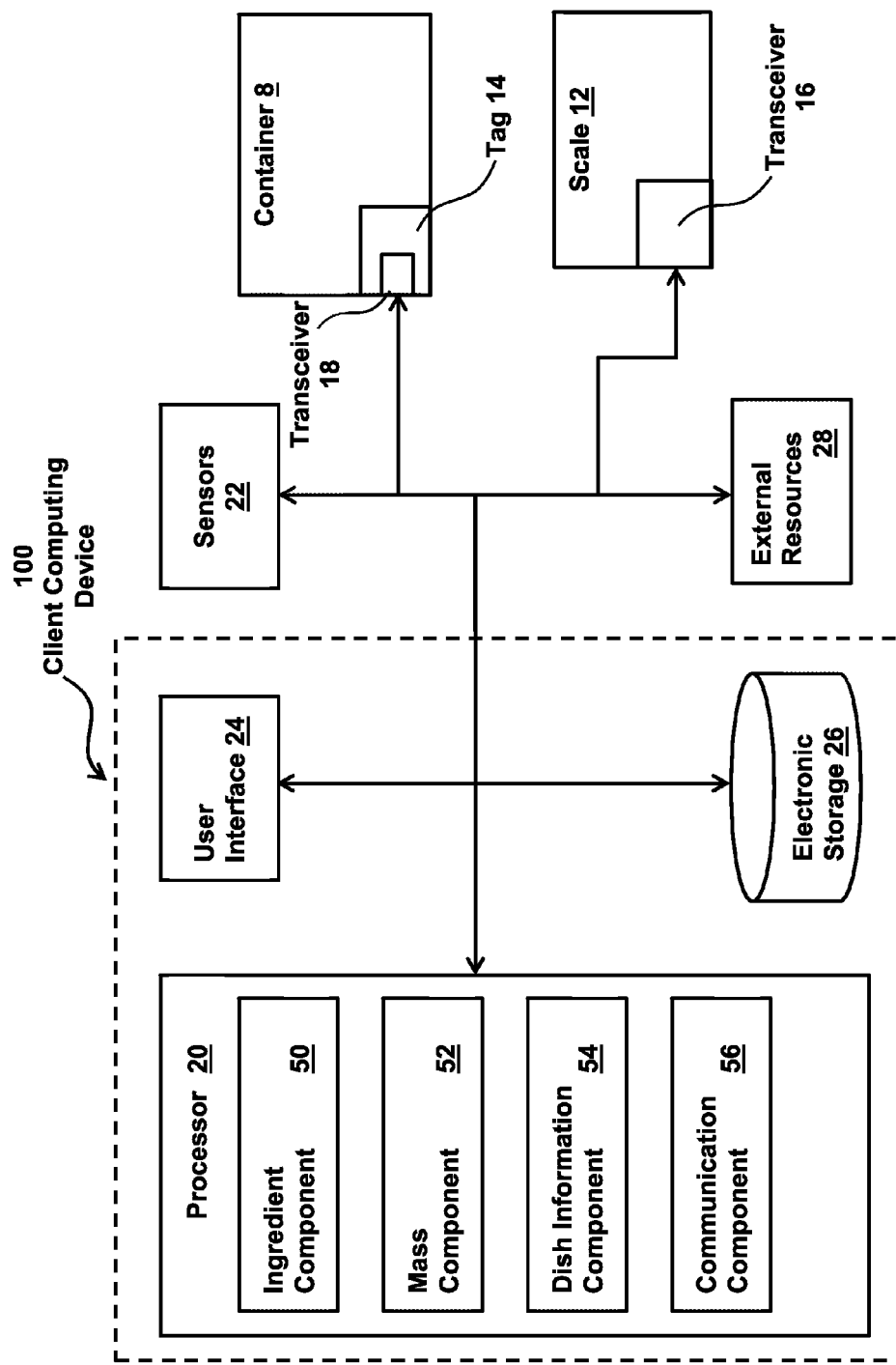
FIG. 1A illustrates a system configured to electronically store dish information on tags coupled with storage containers.

FIG. 1A illustrates a system 10 configured to electronically store dish information on tags 14 coupled with storage containers 8. The dish information may be related to properties (e.g., weight) of a given container 8, the ingredients of a dish held by container 8, and/or other information. System 10 may include near field communication (NFC) components (e.g., tag 14, transceiver 18, transceiver 16, processor 20, etc. shown in FIG. 1) that facilitate an improved meal preparation and/or meal storage experience for users. Containers 8 (e.g., cups, bowls, plates, etc.) may be coupled with an individual tag 14 that is configured to electronically store information about container 8, the contents of container 8, and/or other information. By including NFC components in system 10 a given container 8 coupled with a corresponding tag 14 may become "smart." For example, a sensor 22 included in scale 12 (for example) may recognize tag 14 and/or determine information related to the contents (e.g., as stored on tag 14) of container 8 when container 8 is placed on and/or near scale 12.

By way of a non-limiting example, after a user finishes preparing and/or serving a dish using scale 12, system 10 may be configured to identify containers 8 into which leftovers are placed. System 10 may be configured to determine what food is stored in which containers 8, where the containers 8 are stored, individual nutritional information for the food stored in a given container 8, and/or other dish information. System 10 may be configured to facilitate electronic storage of this dish information on the tags 14 coupled with containers 8, in electronic storage, and/or in other locations. The dish information may include, for example, information related to a name of the dish, an ingredients list, a calorie content, nutritional information, allergy information, a number of servings held by the container, quantities of individual ingredients in the dish, preparation instructions, a dish preparation date, a dish expiration date, a storage location, and/or other information.

By way of a second non-limiting example, system 10 may be useful when a user wants to add an ingredient to a dish after it has already been prepared and the ingredients are held by container 8 (e.g., a bowl). System 10 eliminates the need to transfer the contents of container 8 into other containers so that information about the new ingredient alone may be determined. System 10 may be configured to exclude the weight (for example) of container 8 (e.g., stored on tag 14) and/or its contents when determining information related to the new ingredient (e.g., determining a weight of the new ingredient, calculating a calorie content of the dish including the new ingredient, etc.).

In some implementations, system 10 may include one or more of a container 8, a tag 14, a scale 12, a sensor 22, a processor 20, a user interface 24, electronic storage 26, external resources 28, and/or other components. In some implementations, one or more of processor 20, user interface 24, electronic storage 26, and/or other components of system 10 may be included in a client computing device 100.

Client computing device 100 may be configured such that a user may access system 10 via client computing device 100. In some implementations, client computing device 100 may be configured to communicate with one or more external resources 28 according to a client/server architecture. By way of non-limiting example, a given client computing device 100 may include one or more of a desktop computer, a laptop computer, a handheld computer, a tablet computing platform, a NetBook, a smartphone, and/or other computing platforms.

In some implementations, client computing device 100 may be configured to communicate with scale 12 according to a peer-to-peer architecture, a client/server architecture, and/or other architectures. Client computing device 100 and/or scale 12 may include communication lines, or ports to enable the exchange of information with a network, other computing platforms (e.g., one or more other client computing devices 100), and/or other devices. In some implementations, communication between client computing device 100, scale 12, external resources 28, and/or other components of system 10 may be wireless and/or via wires. For example, client computing device 100 may communicate with scale 12 wirelessly via a Wi-Fi network, via Bluetooth® technology, and/or other wireless technology. In some implementations, client computing device 100 may communicate with scale 12 via a wired USB connection, for example.

Container 8 may be configured to hold, store, and/or otherwise contain food and/or other materials. Container 8 may be configured such that a user may easily place container on scale 12 and/or remove container 8 from scale 12. Container 8 may be configured to hold food temporarily and/or for an extended period of time. Container 8 may be configured to receive a lid to enclose the food held by container 8. Container 8 may be portable, configured to be stored in refrigerated and/or non-refrigerated environments, configured to be stored on a shelf, and/or have other properties. In some implementations, container 8 may be compatible with a microwave. In some implementations, container 8 may be a pot and/or pan configured for cooking on a stovetop, in an oven, on a barbeque, and/or for other cooking methods. For example, container 8 may include a bowl, a plate, a cup, a zip lock back, a pot, a pan, Tupperware, and/or other containers. In short, container 8 may be any device configured to hold food.

In some implementations, container 8 may be configured to be coupled with tag 14 (described below). For example, container 8 may include a slot, a recess, and/or other features configured to receive tag 14. In some implementations, container 8 may be configured such that tag 14 is embedded in container 8. In some implementations, container 8 may be configured such that tag 14 is removably and/or fixedly coupled to a surface of container 8. For example, container 8 may be configured such that tag 14 may be coupled to an outside surface of container 8 via adhesive and/or other methods.

Tag 14 may be configured to be coupled with container 8. Tag 14 may be configured to electronically store dish information related to the ingredients held by container 8, the mass of container 8, and/or other information. Tag 14 may be configured for near field communication. In some implementations, tag 14 may be and/or include a radio frequency identification (RFID) tag. In some implementations, tag 14 may be passive and configured to emit microwaves, UHF radio waves, and/or other output signals that convey information stored on tag 14. In some implementations, tag 14 may include a wireless transceiver 18 configured to communicate wirelessly with a wireless transceiver 16 carried by scale 12. In some implementations, tag 14 may include a power source and/or may be powered by an interrogating magnetic field and/or other signals, for example. In some implementations, tag 14 may include an electronic memory; a processor for facilitating storage and processing of information, modulating and demodulating a radio-frequency (RF) signal, collecting power from an interrogating signal, and/or other purposes; and/or other components.

Tag 14 may be removably and/or fixedly coupled with container 8. In some implementations, tag 14 may be embedded within container 8. In some implementations, tag 14 may be and/or include a passive "patch" that a user may attach to any of their own housewares (e.g., containers 8). In some implementations, for example, tag 14 may be and/or include a small silicone-wrapped coin and/or tile-shaped tag that removably and/or fixedly couples with housewares (e.g., containers 8). The description of a silicone-wrapped coin and a tile-shaped tag are not intended to be limiting. Tag 14 may have any form that allows it to function as described herein.

Transceivers 16 and 18 may be configured to transmit and receive communication signals. In some implementations, transceivers 18 and 16 may transmit and receive dish information and/or other information via the communication signals. In some implementations, transceivers 18 and 16 may transmit and/or receive the dish information via wireless radio-frequency signals, electromagnetic fields, and/or other communication signals. In some implementations, transceivers 18 and 16 may be configured to transmit and receive communication signals substantially simultaneously.

Transceiver 16 may be carried by scale 12. Being carried by scale 12 may include being physically connected to scale 12, wired and/or wirelessly coupled with scale 12, housed by a housing body of scale 12, integrated into the electrical components of scale 12, coupled with a surface of the housing body of scale 12, and/or other methods for being carried by scale 12. Transceiver 18 may be carried by tag 14. Being carried by tag 14 may include being physically connected to tag 14, wired and/or wirelessly coupled with tag 14, integrated into the electrical components of tag 14, coupled with a surface of tag 14, and/or other methods for being carried by scale 12.

Scale 12 may be configured to generate output signals conveying information related to masses and/or weights of individual ingredients added to a dish, a mass of container 8 placed on scale 12 to hold the ingredients, and/or other information. Scale 12 may be located in and/or near a food preparation area. A food preparation area may include a kitchen, a countertop, a table, a food specific (e.g., no nuts) preparation surface on a countertop and/or table, and/or other food preparation areas. As such, scale 12 may include surfaces configured to be wiped off and/or cleaned, touch sensitive and/or physical buttons that may be utilized by a user whose finger may be dirtied by food preparation, and/or other features of a scale designed for use in a food preparation area. In some implementations, the whole surface area of scale 12 may be touch sensitive. In some implementations, scale 12 may be portable such that a user may move scale 12 from one food preparation area to another and/or move scale 12 within a food preparation area. Scale 12 may be powered via AC power (e.g., a typical three-prong power outlet), powered via batteries, and/or powered via other sources. In some implementations, scale 12 may be controlled via client computing device 100.

Scale 12 may be configured such that, as individual ingredients are added to a dish, scale 12 determines the masses and/or weights as the ingredients are added to the dish. For example, a second ingredient and/or any other additional ingredients may be added successively to the dish after a first ingredient. The weight of the first ingredient (e.g., a stick of butter) may be determined after it is added to the dish (e.g., by subtracting a previously determined weight of container 8). The weight of a second ingredient (e.g., salt) may be determined as it is added to the dish scoop by scoop, for example.

It should be noted that the use of terms such as "mass", "weight", and/or other terms related to an amount of the individual ingredients throughout the present disclosure is not intended to be limiting. In some implementations, scale 12 may be configured to generate output signals related to a volume, a physical form (e.g., a bushel and/or an ear of corn), and/or other measures of the individual ingredients added to a dish.

Sensor 22 may be configured to generate output signals that convey information related to presence of one or more tags 14. Sensor 22 may be configured to generate output signals that convey information related to presence of a given tag 14 responsive to the given tag 14 being in proximity to sensor 22. In some implementations, sensor 22 comprises one or more sensors positioned in one or more locations in system 10. In some implementations, at least one sensor 22 may be included in scale 12. Sensor 22 may be configured to detect presence of tag 14 at or near scale 12. Sensor 22 may be configured to generate output signals that convey information indicating the presence of tag 14 responsive to container 8 (coupled with tag 14) being placed at or near scale 12. In some implementations, sensor 22 may be configured for near field communication. For example, sensor 22 may be an RFID reader. Sensor 22 may be configured to cause transceiver 16 to transmit interrogator signals and/or receive replies from tags 14, for example.

Processor 20 may be configured to execute computer program components. The computer program components may be configured to enable an expert and/or user associated with a given client computing device 100 to interface with scale 12 and/or external resources 28, and/or provide other functionality attributed herein to client computing device 100 and/or processor 20. The computer program components may include an ingredient component 50, a mass component 52, a dish information component 54, a communication component 56, and/or other components.

Processor 20 may communicate wirelessly with scale 12, transceiver 18 of tag 14 coupled with container 8, external resources 28, sensor 22, user interface 24, electronic storage 26, and/or other components of system 10. In some implementations, processor 20 may communicate with scale 12, external resources 28, sensor 22, user interface 24, electronic storage 26, and/or other components of system 10 via wires.

Ingredient component 50 may be configured to obtain ingredient information indicating which individual ingredient is currently being added to the dish. The ingredient information may be obtained from a user via user interface 24, obtained via external resources 28, and/or obtained via in other ways. Ingredient component 50 may be configured to obtain the ingredient information by causing user interface 24 to display one or more views of a graphical user interface to a user. The one or more views may include selectable images, a textual information entry field, and/or other information that facilitates entry and/or selection of ingredient information by the user. For example, ingredient component 50 may cause user interface 24 to display selectable pictures of various ingredients. Responsive to the user selecting one of the displayed pictures, ingredient component 50 may obtain ingredient information indicating that the ingredient displayed in the selected picture is being added to the dish. As another example, ingredient component 50 may obtain ingredient information that corresponds to the name of an ingredient typed by a user into a textual information entry field.

In some implementations, ingredient component 50 may be configured such that obtaining the ingredient information via external resources 28 may include reading, scanning, and/or optically recognizing information that identifies an individual ingredient. For example, external resources 28 may include a scanner configured to recognize a bar code and/or other identifying information included on the packaging of an individual ingredient.

In some implementations, ingredient component 50 may obtain ingredient information responsive to sensor 22 sensing presence of tag 14. Responsive to container 8 being placed in proximity to sensor 22, ingredient component 50 may retrieve dish information (for a dish stored by container 8) previously stored on tag 14, for example. In some implementations, ingredient component 50 may obtain ingredient information responsive to sensor 22 sensing presence of an individual ingredient on or near scale 12, client computing device 100, and/or other components of system 10. For example, sensor 22 may detect presence of RFID tags (e.g., tags similar to tag 14 but not coupled with container 8) in the packaging of an ingredient and/or other markers in the individual ingredients themselves.

Mass component 52 may be configured to determine the masses and/or weights of the individual ingredients added to the dish, of container 8, and/or other masses and/or weights. The determinations may be based on the output signals from scale 12 and/or other information. The mass and/or weight determinations for the individual ingredients may be made by mass component 52 without intervention via scale 12 and/or client computing device 100 by the user. For example, the user does not need to manually tare scale 12 after placing container 8 on scale 12, and/or after adding a first ingredient and before adding a second ingredient. The mass and/or weight determinations for the individual ingredients may be made with the previously added ingredients still on scale 12 as a current ingredient is being added to the dish. For example, responsive to the obtained ingredient information indicating that the first ingredient is being added to the dish, mass component 52 may determine a first mass and/or weight of the first ingredient. Responsive to the obtained ingredient information indicating that the second ingredient is being added to the dish (e.g., with the first ingredient still on scale 12), mass component 52 may determine a second mass and/or weight of the second ingredient. The second mass and/or weight of the second ingredient may be based on the mass of container 8, the mass of the first ingredient, a total mass of the dish, and/or other information.

In some implementations, mass component 52 may be configured such that determining the second mass and/or weight of the second ingredient based on the weight of container 8, the first mass and/or weight of the first ingredient, and a total mass and/or weight of the dish includes determining a mass and/or weight of the second ingredient by subtracting a total mass and/or weight of the first ingredient (and container 8) from a total mass and/or weight of the dish. In some implementations, mass component 52 may be configured to tare scale 12 before each individual ingredient is added to the dish. For example, mass component 52 may be configured to tare scale 12 before the first individual ingredient is added to the dish and before the second individual ingredient is added to the dish. In some implementations, mass component 52 may be configured such that the masses and/or weights of the individual ingredients are current running totals of the masses and/or weights of the individual ingredients added to the dish during preparation.

Dish information component 54 may be configured to determine dish information for the dish. Dish information component 54 may determine the dish information based on information determined by ingredient component 50, information determined by mass component 52, the output signals from scale 12, information stored on tag 14, and/or other information. Dish information component 54 may be configured to determine dish information for the dish based on the individual ingredients, the masses and/or weights of container 8 and/or the ingredients added to the dish, information stored on client computing device 100, information stored in and/or accessed via external resources 28, information stored on tag 14, and/or other information. In some implementations, external resources 28 may include a nutritional information database, a recipe database, and/or other databases accessed by dish information component 54 to determine the dish information.

In some implementations, the dish information may include information related to one or more of a name of the dish, an ingredients list, a calorie content, nutritional information, allergy information, a number of servings held by container 8, quantities of individual ingredients in the dish, preparation instructions, a dish preparation date, a dish expiration date, a storage location, a color and/or other physical properties of a container, and/or other information. The dish information may include, for example, information related to calories, vitamins, minerals, a nutritional index, a nutritional summary, an analysis of the nutritional information, and/or other information related to the individual ingredients added to the dish. In some implementations, the dish information determined by dish information component 54 may include container information related to a type of container 8, dimensions of container 8, identifying characteristics of an individual container 8, and/or other information. The type of container may be one or more of a plate, a bowl, a cup, a zip lock back, a pot, a pan, Tupperware, and/or other containers, for example.

In some implementations, the dish information may include information related to specific dietary labels, allergens, and/or other information. The allergens may include, for example, foods such as dairy, shellfish, tree nuts, peanuts, and/or other food and/or drink allergens. The specific dietary labels may include vegetarian, vegan, gluten free, kosher, and/or other dietary labels. In some implementations, dish information component 54 may determine the information related to specific dietary labels, allergens, and/or other information so that a user may be notified of the specific dietary labels and/or allergens associated with a given dish when container 8 is later retrieved from storage and sensor 22 reads the information on tag 14, for example. In some implementations, dish information component 54 may determine the information related to specific dietary labels, allergens, and/or other information so that one or more containers 8 may be stored according to their associated dietary labels, allergens, and/or other information. For example, containers 8 holding dishes containing nuts may be stored separately from other containers 8 to benefit those with nut allergies. In some implementations, dish information component 54 may cause user interface 24 to alert a user of specific information related to allergens and/or dietary labels responsive to the user retrieving a given container 8 from storage and placing it on or near scale 12 so that sensor 22 can read the information on tag 14.

Communication component 56 may be configured to cause wireless transceiver 16 to transmit the dish information, the mass of container 8, and/or other information to wireless transceiver 18 so that the dish information, the mass of container 8, and/or other information may be stored on tag 14. Communication component 56 may be configured to receive dish information, the mass of container 8, and/or other information via wireless transceiver 16, wireless transceiver 18, and/or other components of system 10. In some implementations, communication component 56 may facilitate communication between processor 20 and scale 12, external resources 28, sensor 22, user interface 24, electronic storage 26, and/or other components of system 10. In some implementations, communication component 56 may facilitate communication between components of system 10 responsive to sensor 22 detecting presence of tag 14 at or near scale 12.

By way of a non-limiting example, responsive to a user adding an additional ingredient after completing preparation of a dish (with container 8 on scale 12), mass component 52 may determine a mass of the additional ingredient based on the output signals from scale 12, the information already stored on tag 14, and/or other information. Dish information component 54 may determine adjusted dish information based on the additional ingredient and its corresponding mass. Communication component 56 may cause wireless transceiver 16 to transmit the mass of the additional ingredient, the adjusted dish information, and/or other information to wireless transceiver 18 so that the dish information stored on the tag is adjusted to reflect the dish including the additional ingredient.

By way of a second non-limiting example, responsive to container 8 holding the ingredients being removed from storage (e.g., the refrigerator) and placed at or near scale 12 such that sensor 22 detects presence of tag 14, communication component 56 may effectuate the wireless communication between wireless transceiver 18 and wireless transceiver 16. Dish information component 54 may determine dish information for the dish stored in container 8, the mass of container 8, and/or other information based on the information stored on tag 14.

User interface 24 may be configured to provide an interface between client computing device 100 and the user through which the user may provide information to and receive information from system 10. This enables data, cues, results, and/or instructions and any other communicable items, collectively referred to as "information," to be communicated between the user and system 10.

By way of a non-limiting example, user interface 24 may be configured to receive entry and/or selection of ingredient information indicating which individual ingredient is currently being added to the dish during preparation. Receiving entry and/or selection of ingredient information may include a user typing the name of an ingredient via a key pad and/or a keyboard, selecting (e.g., via a mouse and/or a touchscreen) an ingredient from a list of ingredients, selecting a picture of an ingredient, and/or other entry and/or selection. In some implementations, user interface 24 and/or external resources 28 may be configured such that receiving entry and/or selection of the ingredient information may include reading, scanning, and/or optically recognizing information that identifies an individual ingredient. For example, external resources 28 and/or client computing device 100 may include a scanner controlled via user interface 24 that are configured to recognize a bar code and/or other identifying information included on the packaging of an individual ingredient. External resources 28 and/or client computing device 100 may include optical recognition equipment controlled via user interface 24 that is configured to optically recognize individual ingredients.

In some implementations, user interface 24 may be configured to receive entry and/or selection of an electronic recipe for preparation by the user. The electronic recipe may specify target masses and/or weights of the individual ingredients in the dish. For example, the electronic recipe may specify a first target mass for a first ingredient and a second target mass for a second ingredient. The existing electronic recipe may be stored locally on client computing device 100 (e.g., in electronic storage 26), stored in an external database (e.g., external resources 28), accessed via the internet and/or other networks, and/or be retrieved from other sources. User interface 24 may be configured such that a user may navigate through electronic folders, the internet, and/or other electronic storage areas to locate, view, and/or select a desired recipe.

Examples of interface devices suitable for inclusion in user interface 24 include a touch screen, a keypad, touch sensitive and/or physical buttons, switches, a keyboard, knobs, levers, a display, speakers, a microphone, an indicator light, an audible alarm, a printer, and/or other interface devices. In some implementations, user interface 24 includes a plurality of separate interfaces. In some implementations, user interface 24 includes at least one interface that is provided integrally with client computing device 100 and/or scale 12.

It is to be understood that other communication techniques, either hard-wired or wireless, are also contemplated by the present disclosure as user interface 24. For example, the present disclosure contemplates that user interface 24 may be integrated with a removable storage interface provided by client computing device 100. In this example, information may be loaded into client computing device 100 from removable storage (e.g., a smart card, a flash drive, a removable disk) that enables the user to customize the implementation of client computing device 100. Other exemplary input devices and techniques adapted for use with client computing device 100 as user interface 24 include, but are not limited to, an RS-232 port, RF link, an IR link, modem (telephone, cable or other). In short, any technique for communicating information with client computing device 100 is contemplated by the present disclosure as user interface 24.

Electronic storage 26 may comprise electronic storage media that electronically stores information. The electronic storage media of electronic storage 26 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 26 may comprise one or more of optically readable storage media (e.g., optical disks, etc.), magnetically readable storage media (e.g., magnetic tape, magnetic hard drive, floppy drive, etc.), electrical charge-based storage media (e.g., EPROM, RAM, etc.), solid-state storage media (e.g., flash drive, etc.), and/or other electronically readable storage media. Electronic storage 26 may store software algorithms, information (e.g., dish information) determined by processor 20, and/or other information that enables system 10 to function properly. Electronic storage 26 may be (in whole or in part) a separate component within system 10, or electronic storage 26 may be provided (in whole or in part) integrally with one or more other components of system 10 (e.g., client computing device 100, processor 20).

External resources 28 may include sources of information (e.g., an electronic recipe database, a nutritional information database), one or more servers outside of system 10, a network (e.g., the internet), electronic storage, equipment related to Wi-Fi technology, equipment related to Bluetooth® technology, data entry devices, scanning equipment, sensors, and/or other resources. External resources 28 may include optical recognition equipment configured to optically recognize individual ingredients. In some implementations, some or all of the functionality attributed herein to external resources 28 may be provided by resources included in system 10. External resources 28 may be configured to communicate with client computing device 100 and/or other components of system 10 via wired and/or wireless connections, via a network (e.g., a local area network and/or the internet), via cellular technology, via Wi-Fi technology, and/or via other resources. For example, dish information component 54 may access an electronic recipe database that is part of external resources 28 via the internet. As another example, a bar code scanner that is part of external resources 28 may communicate with client computing device 100 via a removable wired connection (e.g., a USB connection).

Figure 1B:
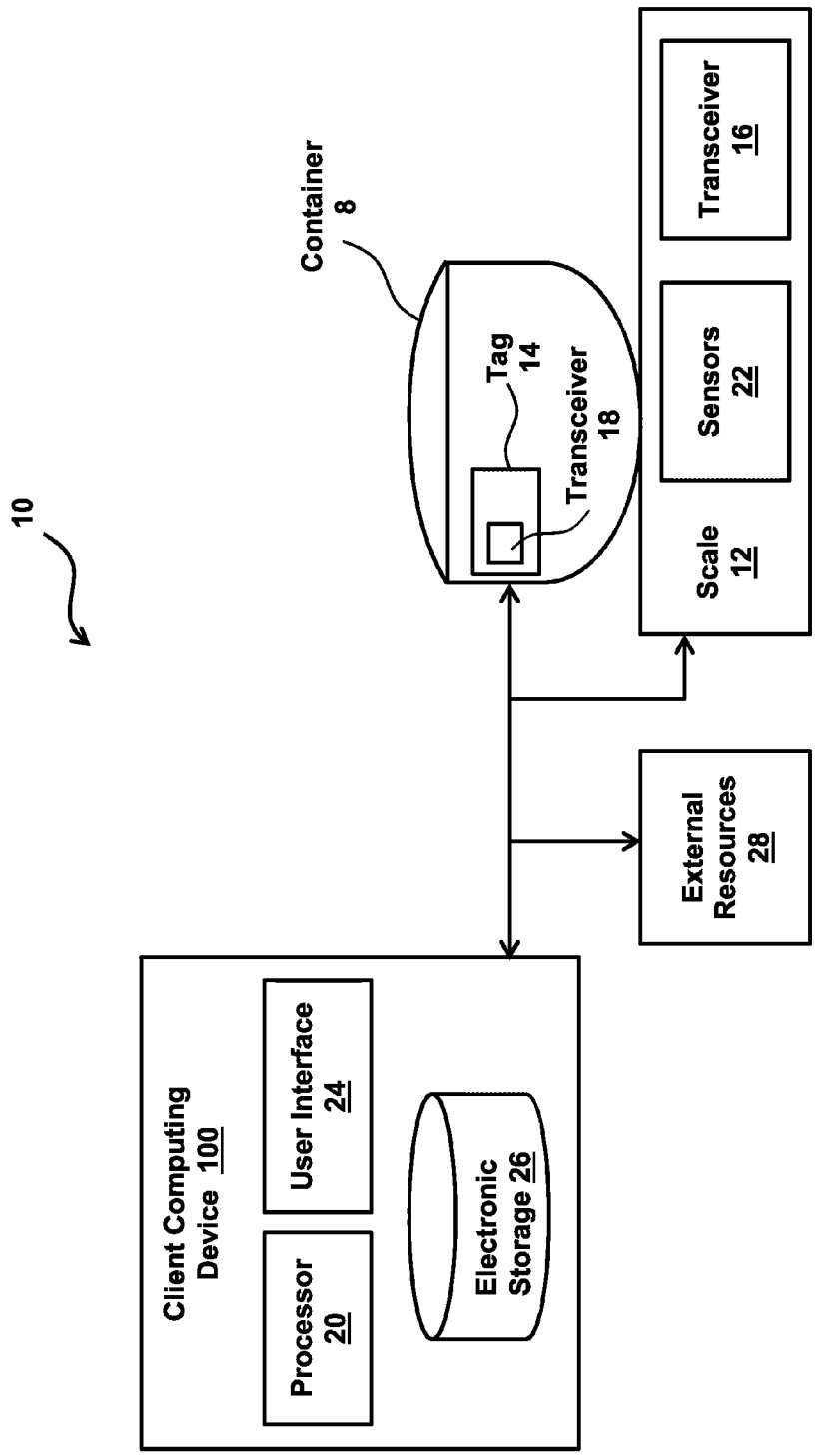
FIG. 1B illustrates a client computing device, a scale, and a container placed on the scale.

By way of a non-limiting example, FIG. 1B illustrates client computing device 100 including processor 20, user interface 24, and electronic storage 26; scale 12 including sensor 22, and transceiver 16; and container 8 coupled with tag 14 and transceiver 18, placed on scale 12. FIG. 1B is not intended to be limiting. In some implementations, for example, processor 20, user interface 24, electronic storage 26, and/or other components may be included in scale 12. In some implementations, one or more external resources 28 may be included in client device 100 and/or scale 12. In the example shown in FIG. 1B, communication component 56 may facilitate communication between transceivers 16 and 18; between scale 12, client computing device 100, and external resources 28; and/or between other components of system 10.

Figure 1C:
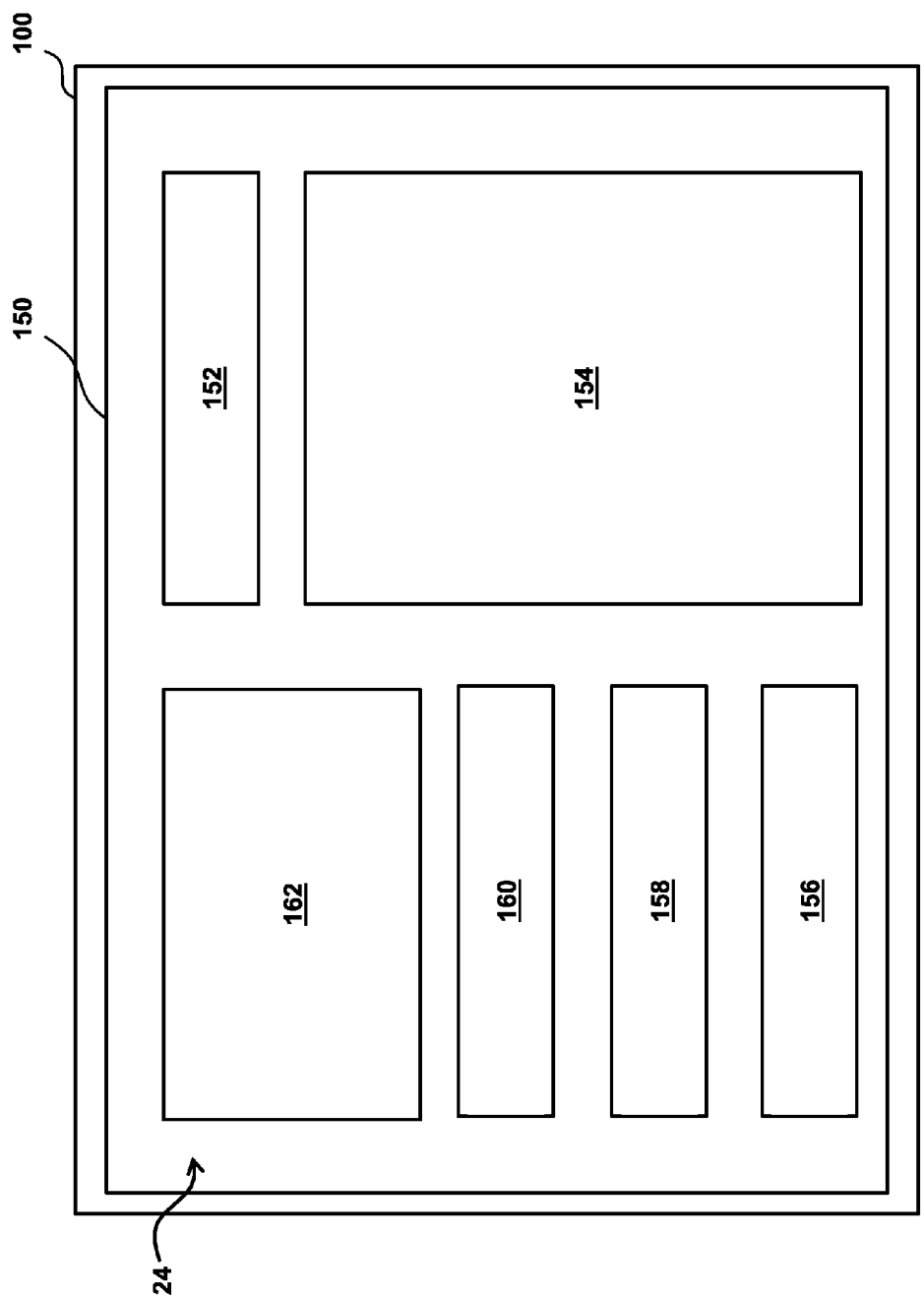
FIG. 1C illustrates a view of a user interface presented to a user on a client computing device.
Figure 1D:
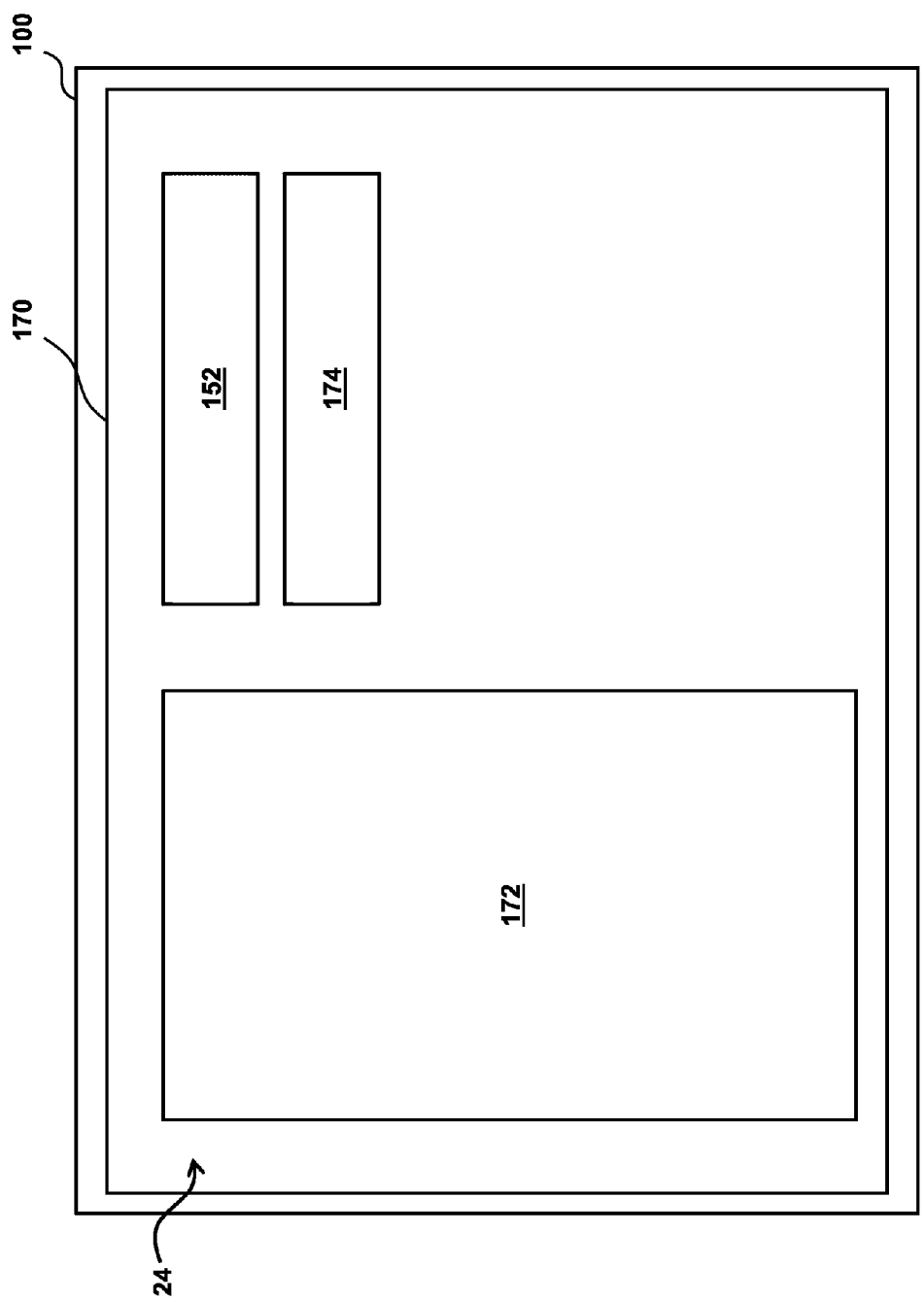
FIG. 1D illustrates a second view of a user interface presented to a user on a client computing device.
Figure 1E:
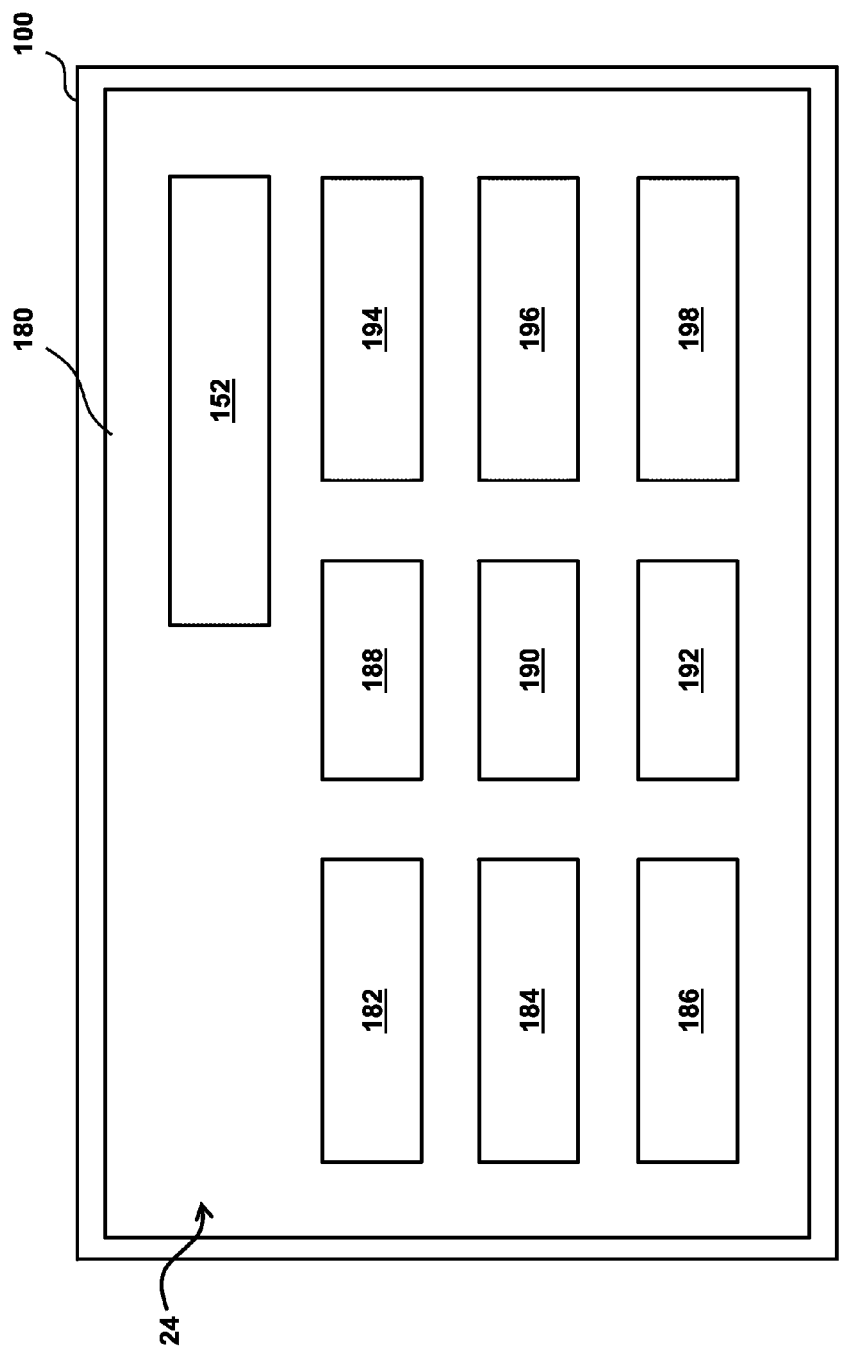
FIG. 1E illustrates a third view of a user interface presented to a user on a client computing device.

FIGS. 1C, 1D, and 1E illustrate views 150 (FIG. 1C), 170 (FIG. 1D), and 180 (FIG. 1E) of user interface 24 presented to a user on client computing device 100, for example. As shown FIG. 1C, view 150 is a view of user interface 24 that may be displayed at a time when food is packed into a container (e.g., container 8 shown in FIG. 1) and/or when the food is associated with the container. View 150 may be presented to a user when, for example, the user has finished preparing the dish and the container (e.g., container 8) holding the dish is on and/or near scale 12 (FIG. 1), in proximity to sensors 22, and/or in other locations. View 150 may include fields such as dish name field 152, ingredients list field 154, date of preparation field 156, expiration date field 158, number of servings contained by the container field 160, notes field 162, and/or other fields. Dish name field 152 may be configured to receive entry and/or selection of a name of the dish from the user. Ingredients list field 154 may be configured to display information related to the ingredients added to the dish by the user (e.g., a listing of the ingredients, quantities, nutritional information, etc.). Date of preparation field 156 and expiration field 158 may be configured to display the date on which the dish was prepared and the date on and/or before which the food should be consumed. Number of servings field 160 may display the number of servings of the dish held by the container (e.g., automatically determined by system 10). Notes field 162 may be configured to receive entry of general notes from the user and/or display general notes about the dish to the user. The number of fields and/or the functionality of the fields described in view 150 is not intended to be limiting. View 150 may include any number and/or types of useful fields that are displayed to a user when the food is packed into a container and/or when the food is associated with the container.

As shown in FIG. 1D, view 170 is a view of user interface 24 that illustrates recalling nutrition information for food previously stored via user interface 24. For example, a container 8 (FIG. 1) holding a dish may be removed from the refrigerator and placed on scale 12 (FIG. 1), and/or in proximity to sensors 22 (FIG. 1). Transceiver 18 of tag 14 (FIG. 1) may transmit information stored on tag 14 and system 10 may be configured such that user interface 24 displays the transmitted information via view 170. View 170 may include fields such as, for example, dish name field 152, storage date field 174, nutrition information field 172, and/or other fields. Storage date field 174 may display the date on which the dish was last stored. Nutrition information field 172 may be configured to display nutritional information to a user and/or receive information from a user. The nutrition information may reflect the nutritional information for the amount of the dish left in the container (e.g., determined by dish information component 54 based on the weight of the dish, information stored during preparation of the dish, and/or other information), for example. The number of fields and/or the functionality of the fields described in view 170 is not intended to be limiting. View 170 may include any number and/or types of useful fields that are displayed to a user when system 10 recalls nutrition information for food previously stored.

As shown in FIG. 1E, view 180 illustrates a view of user interface 24 showing dish information (e.g., nutrition information) for food left in a container after a portion of the food originally stored in the container is eaten. For example, a prepared dish may be stored in a container (e.g., container 8 shown in FIG. 1) and corresponding dish information may be stored on a tag (e.g., tag 14) coupled with the container. A user may eat some of the food stored in the container and place the leftover food in the container back on scale 12 (FIG. 1). System 10 may be configured to update the information stored on the tag based on information previously stored for the dish, new information determined based on the weight of the dish on the scale, and/or other information. View 180 may show dish information for the food left in the container. View 180 may include fields such as dish name field 152, date eaten fields 182, 184, 186, amount eaten fields 188, 190, 192, and updated nutrition information fields 194, 196, 198. Date eaten fields 182, 184, and 186 may indicate one or more dates when at least a portion of the originally stored dish was consumed. Amount eaten fields 188, 190, and 192 may indicate the amount (e.g., weight) of the dish that was eaten on the individual dates. Updated nutrition information fields 194, 196, and 198 may indicate updated nutrition information for the dish after parts of the dish are consumed on the individual dates. The nutrition information may reflect the nutritional information for the amount of the dish left in the container (e.g., determined by dish information component 54 based on the weight of the dish, information stored during preparation of the dish, and/or other information) on the individual dates, for example. The number of fields and/or the functionality of the fields described in view 180 is not intended to be limiting. View 180 may include any number and/or types of useful fields that are displayed to a user when system 10 shows dish information (e.g., nutrition information) for food left in a container after a portion of the food originally stored in the container is eaten.

Figure 2:
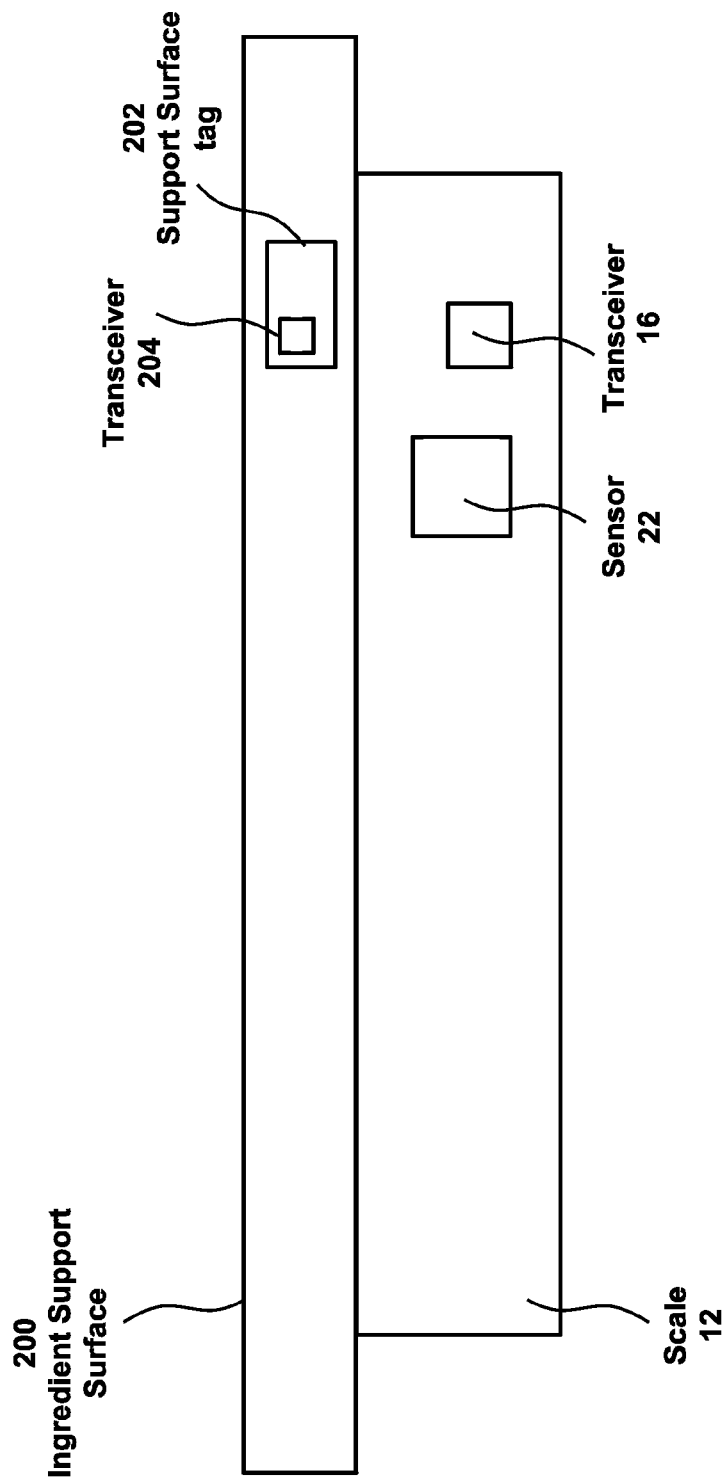
FIG. 2 illustrates a scale including one or more removable ingredient support surfaces.

In some implementations, system 10 may include removable ingredient support surfaces configured to removably couple with scale 12. FIG. 2 illustrates scale 12 including one or more removable ingredient support surfaces 200. Removable ingredient support surface 200 may be configured to physically support the ingredients added to the dish, container 8 placed on scale 12 to hold the ingredients, and/or food preparation tools. In some implementations, container 8 may be placed on a support surface 200 to hold the individual ingredients as they are added to the dish. In some implementations, a support surface 200 may include features configured to receive, hold, and weigh the individual ingredients without additional preparation tools. In some implementations support surface 200 may be and/or include a cutting board configured to removably couple with scale 12. Removable ingredient support surface 200 may be coupled with a corresponding support surface tag 202. Corresponding support surface tag 202 may be configured to electronically store the mass of removable support surface 200 and/or other information. Corresponding support surface tag 202 may include a wireless transceiver 204 configured to communicate wirelessly with wireless transceiver 16 carried by scale 12, wireless transceiver 18 included in tag 14 coupled with container 8, and/or other components of system 10. In some implementations, sensor 22 may be configured to detect presence of support surface tag 202 at or near scale 12.

In some implementations, if the presence of support surface tag 202 is detected at or near scale 12, communication component 56 (shown in FIG. 1) may effectuate wireless communication between wireless transceiver 204 and wireless transceiver 16. The wireless communication may convey the mass of support surface 200 stored on support surface tag 202 to wireless transceiver 16. Mass component 52 may cause scale 12 to tare the mass of support surface 200.

In some implementations scale 12 may be calibrated at manufacture based on the mass of a specific support surface 200. In some implementations the mass of the specific support surface during calibration at manufacture may be written to a corresponding support surface tag 202 also during the manufacturing process. During use, for example, responsive to the specific support surface 200 being placed on scale 12, scale 12 may be configured to identify the specific support surface based on the mass of the support surface during calibration at manufacture, information (e.g., the mass of the support surface) stored on the support surface tag 202, and/or other information. Responsive to a current mass of the specific support surface 200 not matching (e.g., maybe some of the mass of the support surface was lost when the support surface was used as a cutting board while not coupled with scale 12) the mass of the specific support surface 200 during calibration at manufacture and/or the mass stored on the corresponding support surface tag 202, scale 12 may recalibrate based on the current mass of the support surface 200, and the mass of the specific support surface 200 stored on the support surface tag 202 may be updated to reflect the current mass of the specific support surface 200.

By way of a non-limiting example, a given support surface 200 may have a mass of about 253 grams (253 grams is used only as an example). When this top is first put onto scale 12 during the manufacturing process, system 10 (shown in FIGS. 1A and 1B) may acknowledge (e.g., via the information stored on the corresponding support surface tag 202) that it is the given support surface 200 that is removably coupled to scale 12 and tare a baseline mass of 253 grams. During use, if the given support surface 200 were to be removed and used as a cutting board (for example), and cutting of/on the board changes the overall weight of the given support surface 200 (e.g., decreases the mass to 252 grams), then system 10 may recalibrate upon the given support surface 200 being put back onto scale 12. The updated mass of the given support surface 200 may be written to the corresponding support surface tag 202 as well.

Figure 3:
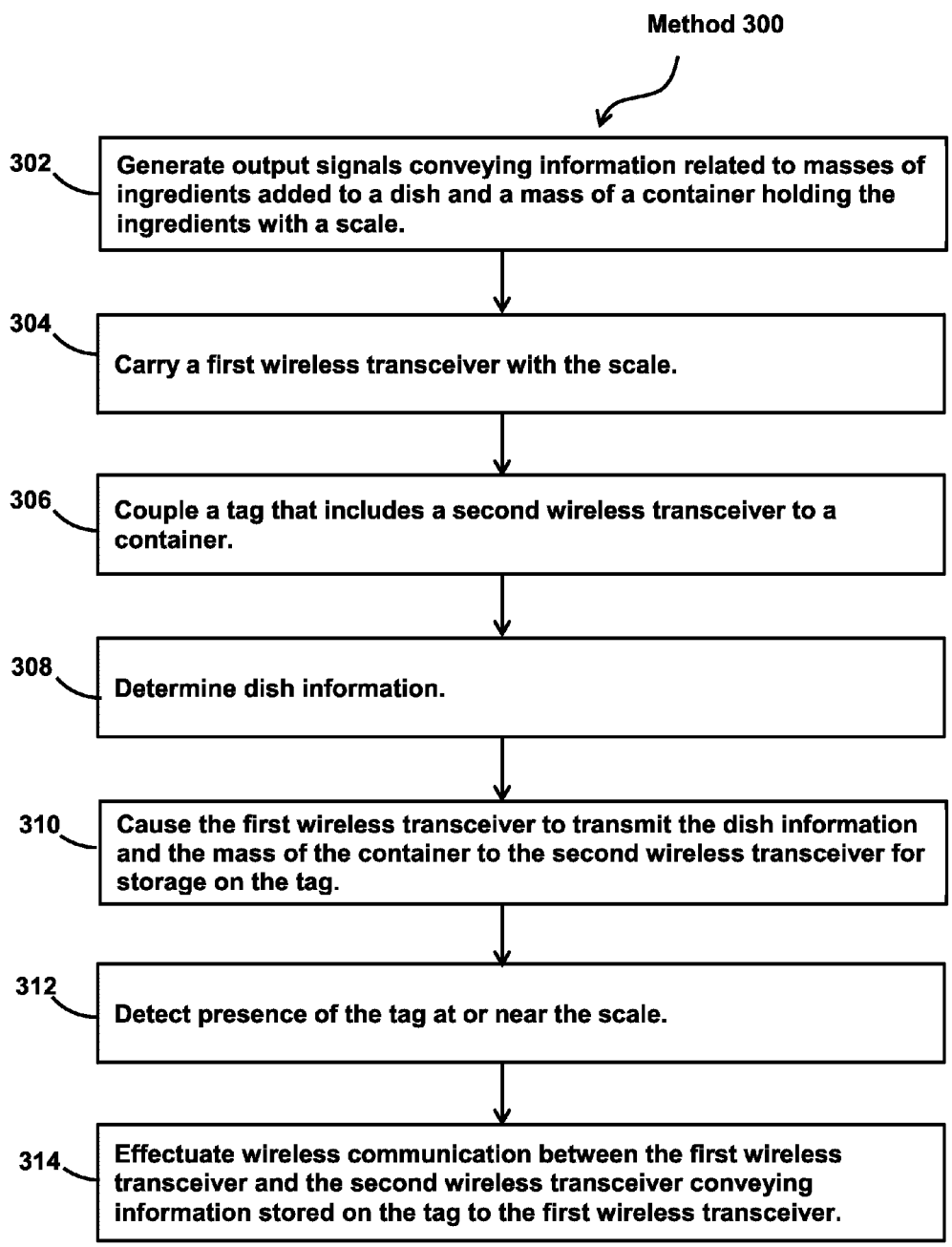
FIG. 3 illustrates a method for electronically storing dish information on tags coupled with storage containers.

FIG. 3 illustrates a method 300 for electronically storing dish information on tags coupled with storage containers. The operations of method 300 presented below are intended to be illustrative. In some implementations, method 300 may be accomplished with one or more additional operations not described, and/or without one or more of the operations discussed. Additionally, the order in which the operations of method 300 are illustrated in FIG. 3 and described below is not intended to be limiting.

In some implementations, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, output signals conveying information related to masses of individual ingredients added to a dish, a mass of a container holding the ingredients, and/or other information may be generated. The container may be placed on the scale by a user to hold the ingredients during preparation of a dish. In some implementations, the ingredients added to the dish and/or the container placed on the scale to hold the ingredients may be physically supported by a removable ingredient support surface. Operation 302 may be performed by a scale that is the same as or similar to scale 12 (shown in FIG. 1 and described herein).

At an operation 304, a first wireless transceiver may be carried by the scale. In some implementations, the first wireless transceiver may be included in the scale and/or may be coupled with a surface of the scale. Operation 304 may be performed by a scale that is the same as or similar to scale 12 (shown in FIG. 1 and described herein).

At an operation 306, a tag may couple to the container. The tag may be configured to electronically store dish information related to the ingredients held by the container, the mass of the container, and/or other information. The tag may include a second wireless transceiver. The second wireless transceiver may be configured to communicate wirelessly with the first wireless transceiver. In some implementations, the ingredient support surface may be coupled with a corresponding surface support tag. The surface support tag may be configured to electronically store the mass of the removable support surface. The surface support tag may include a third wireless transceiver configured to communicate wirelessly with the first wireless transceiver and/or the second wireless transceiver. Operation 306 may be performed by a tag that is the same as or similar to tag 14 (shown in FIG. 1 and described herein).

At an operation 308, dish information may be determined. The dish information may be determined based on the ingredients added to the dish, the output signals from the scale, and/or other information. The dish information may include information related to one or more of a name of the dish, an ingredients list, a calorie content, nutritional information, allergy information, a number of servings held by the container, quantities of individual ingredients in the dish, preparation instructions, a dish preparation date, a dish expiration date, a storage location, and/or other information. In some implementations, the dish information may be determined based on information in an external database, and/or other external resources. In some implementations, container information may be obtained. The container information may be related to one or more of a type of the container, dimensions of the container, and/or other container information. In some implementations, the container may be a plate a bowl, a cup, and/or other containers. Operation 308 may be performed by one or more processors the same as or similar to processor 20 (shown in FIG. 1 and described herein).

At an operation 310, the first wireless transceiver may be caused to transmit the dish information, the mass of the container, and/or other information to the second wireless transceiver for storage on the container tag. In some implementations, responsive to a user adding an additional ingredient after completing preparation of a dish, a mass of the additional ingredient may be determined based on the output signals from the scale and the information stored on the container tag, and the first wireless transceiver may be caused to transmit the mass of the additional ingredient to the second wireless transceiver so that the dish information stored on the container tag is adjusted to reflect the dish including the additional ingredient. Operation 310 may be performed by one or more processors that are the same as or similar to processor 20 (shown in FIG. 1 and described herein).

At an operation 312, presence of the container tag at or near the scale may be detected. In some implementations, the presence of the support surface tag at or near the scale may be detected. Operation 312 may be performed by one or more sensors that are the same as or similar to sensor 22 (shown in FIG. 1 and described herein). In some implementations, sensor 22 may be included in scale 12.

At an operation 314, wireless communication between the first wireless transceiver and the second wireless transceiver conveying information stored on the container tag to the first wireless transceiver may be effectuated. For example, responsive to the container holding the ingredients being removed from storage and placed at or near the scale such that the one or more sensors detect presence of the tag, the wireless communication between the first wireless transceiver and the second wireless transceiver may be effectuated and the dish information and the mass of the container may be determined based on the information stored on the tag. In some implementations, wireless communication between the first wireless transceiver and the third wireless transceiver conveying the mass of the support surface may be effectuated. The mass of the support surface may be communicated to the first wireless transceiver so that the scale may tare the mass of the support surface. Operation 314 may be performed by one or more processors that are the same as or similar to processor 20 (shown in FIG. 1 and described herein).

Returning to FIG. 1, processor 20 may be configured to provide information processing capabilities in system 10. As such, processor 20 may comprise one or more of a digital processor, an analog processor, a digital circuit designed to process information, an analog circuit designed to process information, a state machine, and/or other mechanisms for electronically processing information. Although processor 20 is shown in FIG. 1A as a single entity, this is for illustrative purposes only. In some implementations, processor 20 may comprise a plurality of processing units. These processing units may be physically located within the same device (e.g., client computing device 100), or processor 20 may represent processing functionality of a plurality of devices operating in coordination (e.g., client computing device 100 and scale 12). Processor 20 may be configured to execute components 50, 52, 54, and/or 56 by software; hardware; firmware; some combination of software, hardware, and/or firmware; and/or other mechanisms for configuring processing capabilities on processor 20.

It should be appreciated that although components 50, 52, 54, and 56 are illustrated in FIG. 1A as being co-located within a single processing unit, in implementations in which processor 20 comprises multiple processing units, one or more of components 50, 52, 54, and/or 56 may be located remotely from the other components (e.g., such as within scale 12). The description of the functionality provided by the different components 50, 52, 54, and/or 56 described herein is for illustrative purposes, and is not intended to be limiting, as any of components 50, 52, 54, and/or 56 may provide more or less functionality than is described. For example, one or more of components 50, 52, 54, and/or 56 may be eliminated, and some or all of its functionality may be provided by other components 50, 52, 54, and/or 56. As another example, processor 20 may be configured to execute one or more additional components that may perform some or all of the functionality attributed below to one of components 50, 52, 54, and/or 56. In some implementations, one or more of components 50, 52, 54, and/or 56 may be executed by a processor incorporated in scale 12, external resources 32, and/or other components of system 10.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to electronically store dish information on tags coupled with storage containers, individual storage containers being configured to receive a dish that comprises sets of ingredients that are added to the individual storage containers by users, the system comprising:

a scale configured to generate output signals conveying information related to masses of individual ingredients of a first set of ingredients added to a first dish and a mass of a first storage container placed on the scale to hold the first set of ingredients, the scale comprising a removable ingredient support surface configured to physically support the individual ingredients of the first set of ingredients added to the first dish and/or the first storage container placed on the scale to hold the individual ingredients, the removable ingredient support surface being coupled with a corresponding support surface tag, the corresponding support surface tag configured to electronically store the mass of the removable support surface;

a first wireless transceiver carried by the scale;

a tag coupled with the first storage container, the tag configured to electronically store first dish information related to the first set of ingredients of the first dish held by the first storage container and the mass of the first storage container, and
wherein the tag includes a second wireless transceiver configured to communicate wirelessly with the first wireless transceiver;
a third wireless transceiver included in the support surface tag, the third wireless transceiver being configured to communicate wirelessly with the first wireless transceiver;
one or more physical computer processors configured by machine-readable instructions to:
determine the first dish information based on the individual ingredients of the first set of ingredients of the first dish added to the first storage container and corresponding output signals from the scale, wherein the first dish information includes aggregated nutritional information for the first dish in the first storage container, the aggregated nutritional information determined based on individual ingredients of the first set of ingredients of the first dish added to the first storage container and the corresponding output signals from the scale; and
cause the first wireless transceiver to transmit the first dish information and the mass of the first storage container to the second wireless transceiver so that the first dish information and the mass of the first storage container are stored on the tag;
wherein the scale further includes at least one sensor configured to detect presence of the support surface tag at or near the scale;
wherein if the presence of the support surface tag is detected at or near the scale, wireless communication between the first wireless transceiver and the third wireless transceiver is effectuated conveying the mass of the support surface stored on the support surface tag to the first wireless transceiver;
wherein the one or more physical processors are further configured by machine-readable instructions to cause the scale to tare the mass of the support surface;
wherein the scale calibrates at manufacture based on the mass of the support surface;
wherein, responsive to the support surface being placed on the scale, the scale is configured to identify the support surface based on the mass of the support surface during calibration at manufacture and information stored on the support surface tag; and
wherein, responsive to a current mass of the support surface not matching the mass of the support surface during calibration at manufacture and/or the information stored on the support surface tag, the scale recalibrates based on the current mass of the support surface, and the mass of the support surface stored on the support surface tag is updated to reflect the current mass of the support surface.

2. The system of claim 1, further comprising one or more sensors configured to detect presence of the tag at or near the scale, and wherein if the presence of the tag is detected at or near the scale, wireless communication between the first wireless transceiver and the second wireless transceiver is effectuated conveying information stored on the tag to the first wireless transceiver.

3. The system of claim 2, wherein at least one of the sensors is included in the scale.

4. The system of claim 3, wherein, responsive to the first storage container holding the first set of ingredients being placed at or near the scale such that the one or more sensors detect presence of the tag, the one or more physical processors are further configured by machine-readable instructions to effectuate the wireless communication between the first wireless transceiver and the second wireless transceiver and determine the first dish information and the mass of the first storage container based on the information stored on the tag.

5. The system of claim 3, wherein the one or more physical processors are further configured by machine-readable instructions to, responsive to a user adding an additional ingredient after completing preparation of the first dish, determine a mass of the additional ingredient based on the output signals from the scale and the first dish information stored on the tag, and cause the first wireless transceiver to transmit the mass of the additional ingredient to the second wireless transceiver so that the first dish information stored on the tag is adjusted to reflect the first dish including the additional ingredient.

6. The system of claim 1, wherein the one or more physical processors are further configured by machine-readable instructions such that the first dish information further includes information related to one or more of a name of the first dish, an ingredients list, a calorie content, allergy information, a number of servings held by the first storage container, quantities of individual ingredients of the first set of ingredients in the first dish, preparation instructions, a dish preparation date, a dish expiration date, or a storage location.

7. The system of claim 6, wherein the one or more physical processors are further configured by machine-readable instructions to determine the first dish information at least in part based on information in an external database.

8. The system of claim 1, wherein the one or more physical processors are further configured by machine-readable instructions to obtain container information related to one or more of a type of the first storage container, or dimensions of the first storage container.

9. The system of claim 8, wherein the one or more physical processors are further configured by machine-readable instructions such that the type of first storage container is one or more of a plate, a bowl, or a cup.

10. The system of claim 1, wherein the one or more physical processors are configured to communicate wirelessly with the scale.

11. A method for electronically storing dish information on tags coupled with storage containers, individual storage containers being configured to receive a dish that comprises sets of ingredients that are added to the individual storage containers by users, the method comprising:
generating output signals with a scale conveying information related to masses of individual ingredients of a first set of ingredients added to a first dish and a mass of a first storage container placed on the scale to hold the first set of ingredients;
physically supporting the first set of ingredients added to the first dish and/or the first storage container placed on the scale to hold the first set of ingredients with a removable ingredient support surface;
obtaining container information related to one or more of a type of the first storage container, or dimensions of the first storage container, wherein the type of container is one or more of a plate, a bowl, or a cup;
carrying a first wireless transceiver with the scale;
coupling a tag with the first storage container, the tag configured to electronically store first dish information related to the first set of ingredients of the first dish held by the first storage container and the mass of the first storage container, and wherein the tag includes a second wireless transceiver configured to communicate wirelessly with the first wireless transceiver;

coupling the removable ingredient support surface with a corresponding support surface tag, the corresponding support surface tag configured to electronically store the mass of the removable support surface, the corresponding support surface tag including a third wireless transceiver configured to communicate wirelessly with the first wireless transceiver determining the first dish information based on the individual ingredients of the first set of ingredients added to the first dish and the corresponding output signals from the scale, wherein the first dish information includes aggregated nutritional information for the first dish in the first storage container, the aggregated nutritional information determined based on individual ingredients of the first set of ingredients of the first dish added to the first storage container and the corresponding output signals from the scale; and causing the first wireless transceiver to transmit the first dish information and the mass of the first storage container to the second wireless transceiver so that the first dish information and the mass of the first storage container are stored on the tag;

detecting presence of the support surface tag at or near the scale with at least one sensor included in the scale;

effectuating wireless communication between the first wireless transceiver and the third wireless transceiver conveying the mass of the support surface stored on the support surface tag to the first wireless transceiver;

causing the scale to tare the mass of the support surface;

calibrating the scale at manufacture based on the mass of the support surface;

responsive to the support surface being placed on the scale, identifying the support surface based on the mass of the support surface during calibration at manufacture and information stored on the support surface tag; and responsive to a current mass of the support surface not matching the mass of the support surface during calibration at manufacture and/or the information stored on the support surface tag, recalibrating the scale based on the current mass of the support surface, and updating the mass of the support surface stored on the support surface tag to reflect the current mass of the support surface.

12. The method of claim 11, further comprising detecting, with one or more sensors, presence of the tag at or near the scale, and wherein if the presence of the tag is detected at or near the scale, effectuating wireless communication between the first wireless transceiver and the second wireless transceiver conveying information stored on the tag to the first wireless transceiver.

13. The method of claim 12, further comprising including at least one of the sensors in the scale.

14. The method of claim 13, further comprising, responsive to the first storage container holding the first set of ingredients being placed at or near the scale such that the one or more sensors detect presence of the tag, effectuating the wireless communication between the first wireless transceiver and the second wireless transceiver and determining the first dish information and the mass of the container based on the information stored on the tag.

15. The method of claim 13, further comprising, responsive to a user adding an additional ingredient after completing preparation of the first dish, determining a mass of the additional ingredient based on the output signals from the scale and the first dish information stored on the tag, and causing the first wireless transceiver to transmit the mass of the additional ingredient to the second wireless transceiver so that the first dish information stored on the tag is adjusted to reflect the first dish including the additional ingredient.

16. The method of claim 11, wherein the first dish information further includes information related to one or more of a name of the first dish, an ingredients list, a calorie content, allergy information, a number of servings held by the first storage container, quantities of individual ingredients in the first dish, preparation instructions, a dish preparation date, a dish expiration date, or a storage location.

17. The method of claim 16, further comprising determining the first dish information at least in part based on information in an external database.

\* \* \* \* \*